United States Patent [19]

Hall et al.

[11] Patent Number: 4,670,483
[45] Date of Patent: * Jun. 2, 1987

[54] FLAME RETARDANT POLYURETHANE COMPOSITIONS

[75] Inventors: Dale R. Hall, Avon Lake; Robert L. Jackson, Fairview Parks; Charles V. Purks, Avon Lake, all of Ohio

[73] Assignee: The BF Goodrich Company, Akron, Ohio

[*] Notice: The portion of the term of this patent subsequent to Sep. 17, 2002 has been disclaimed.

[21] Appl. No.: 794,897

[22] Filed: Nov. 4, 1985

[51] Int. Cl.$^4$ ............................................... C09K 3/28
[52] U.S. Cl. ....................................... 523/179; 521/85; 521/107; 521/165; 521/907; 524/100; 524/120; 524/377; 524/590
[58] Field of Search ................ 252/609; 521/107, 907, 521/85, 165; 524/100, 120, 377, 590; 523/179

[56] References Cited

U.S. PATENT DOCUMENTS

| | | | |
|---|---|---|---|
| 4,154,930 | 5/1979 | Halpern | 521/90 |
| 4,467,056 | 8/1984 | Staendeke et al. | 521/106 |
| 4,514,328 | 4/1985 | Staendeke et al. | 521/106 |
| 4,542,170 | 9/1985 | Hall et al. | 521/85 |

Primary Examiner—John Kight
Assistant Examiner—Kriellion Morgan
Attorney, Agent, or Firm—George A. Kap; Alan A. Csontos

[57] ABSTRACT

This invention relates to flame retarding compositions comprising flame retardants selected from pentate salts and nitrogen-containing phosphates wherein one or both are encapsulated in a material to reduce contacts between the flame retardants during processing and to thus reduce or eliminate pre-reaction between the two flame retardants, which pre-reaction, normally leads to degradation of flameproofing properties of the compositions. The invention is also directed to flame retardant polyurethane compositions containing a polyurethane resin and both of the flame retardants. As between the flame retardants, amount of the phosphate is about 10–99% whereas amount of the pentate salt is about 90–1%, on weight basis. In the polyurethane compositions, combined weight of the two flame retardants is about 10–60%, based on the weight of the polyurethane resin and the two flame retardants.

12 Claims, No Drawings

FLAME RETARDANT POLYURETHANE COMPOSITIONS

BACKGROUND OF THE INVENTION

A prior invention describes intumescent, flame retardant compositions comprising a thermoplastic polyurethane resin; a nitrogen-containing phosphate, selected from amine phosphates, ammonium phosphates, and ammonium polyphosphates; and a pentate salt selected from melammonium pentate and pentate salt of ammelide. Such compositions contain 10–60% by weight of the flame retardants and 90–40% by weight polyurethane resin. The ratio of the flame retardants is about 10–99% by weight of the nitrogen-containing phosphate to about 90–1% of the pentate salt. An aryl phosphate can also be used together with the two flame retardants.

The polyurethane resin referred to above is free of halogens and for certain applications should have an oxygen index (OI) of 29 or greater and UL94 rating of V0, along with other requirements. Although these requirements were met and were exceeded by the compositions noted above, which were prepared on a relatively small scale, scale-up of the preparation of the compositions surprisingly and unexpectedly yielded very disappointing results. Scaled-up compositions have shown a substantial drop in the oxygen index as well as in UL94 rating. It appears that regardless of the level of flame retardants used, continuous compounding under pressure in the scale-up experiments caused reduction in oxygen index to about 27 and increased flame time in the UL94 Vertical Burn Test. For instance, polyurethane compositions formulated on a small scale with increasing amount of the flame retardants, had oxygen rating of 32, 34 and 36 whereas scaled-up compositions containing the same amount of the same flame retardants, had oxygen index of only 27. Likewise, with the UL 94 ratings, whereas the small scale compositions gave rating of V0, the scaled-up compositions gave evaluations of V2 or the samples failed by other criteria, such as burning to the clamp. The following table summarizes the results for the small scale and scaled-up compositions containing three levels of flame retardants consisting of a pentate salt and a nitrogen-containing polyphosphate. The table also dramatizes the loss of flame retardancy of the scaled-up compositions:

| Compositions | Flame Retardancy Tests | | | | | |
|---|---|---|---|---|---|---|
| | OI | | | UL 94 | | |
| small scale | 32 | 34 | 36 | V0 | V0 | V0 |
| scaled-up | 27 | 27 | 27 | None | None | V2 |

The term "None" in the above table indicates that the sample failed the test by another criterion. In this case, the samples burned to the clamp.

A great deal of thought has been given to the poor performance of the scaled-up compositions. The reason for the sub-par performance appears to reside in the amount of processing a composition undergoes during its preparation. Whereas the small scale batch compositions experienced a lesser amount of processing, the scaled-up compositions were prepared in continuous equipment which imparted a significantly higher rate of shear and significantly higher pressures which may have led to some form of a prereaction between the ingredients of the compositions. This appears to be a plausible explanation of what may have taken place during preparation of the scaled-up compositions since the invention described and claimed herein appears to have improved the flame retarding performance in terms of oxygen index and the UL 94 test of the scaled-up compositions.

Although there is no rigorous cause and effect understanding of what happened when the small scale batch preparation of the compositions was scaled-up to continuous production on a larger scale, the conclusions drawn herein are based on observed occurrences. For instance, it was observed that there was odor evolution from the scaled-up compositions. This means that a reaction was taking place which was not the case with the small scale, batch production. The degree of damage to the flame retarding properties of the flame retardants appears to be related primarily to the rate of shear during processing, which is a measure of particle—particle collisions between the two flame retardants. Temperature and pressure may also be contributing factors.

The invention referred to above is described and claimed in U.S. Pat. No. 4,542,170 issued Sept. 17, 1985 and entitled "Intumescent Flame Retarded Polyurethane Compositions" of the inventors D. R. Hall and R. L. Jackson. This patent is incorporated by reference as if fully set forth herein.

SUMMARY OF THE INVENTION

This invention relates to preparation of intumescent and flame retardant compositions by encapsulating one or both of the principal fire retardants before mixing the two retardants in a predetermined ratio. This invention is also directed to thermoplastic polyurethane compositions which are prepared by encapsulating one or both of the principal fire retardants and mixing them with a polyurethane resin. The first principal flame retardant is a nitrogen-containing phosphate selected from amine phosphates, ammonium phosphate, ammonium polyphosphates, and mixtures thereof, whereas the second principal flame retardant is a pentate salt selected from melammonium pentate, pentate salt of ammelide, and mixtures thereof. Also, an aryl phosphate can also be used with the two flame retardants.

DETAILED DESCRIPTION OF THE INVENTION

This invention is directed to encapsulation of one or both of the flame retardants to reduce or eliminate contacts between the ingredients in order to retain their flame retarding property. This invention is also directed to thermoplastic polyurethane compositions comprising a mixture of a polyurethane resin and the flame retardants wherein one or both of the retardants are encapsulated to reduce or eliminate the prereaction of the ingredients on processing of the ingredients.

The flame retardants of principal interest herein are selected from nitrogen-containing phosphates and pentate salts. The nitrogen-containing phosphates include amine phosphates, ammonium phosphates, ammonium polyphosphates, and mixtures thereof, whereas the pentate salts include melammonium pentates, pentate salts of ammelide, and mixtures thereof. In a preferred embodiment, only the nitrogen-containing phosphate is encapsulated. Amount of the encapsulant can vary from about 0.5 to 25% by weight of the composition consisting of the flame retardants and the encapsulant. In a preferred embodiment, amount of encapsulant can vary from about 5 to 15% by weight. The encapsulant is selected from various encapsulating materials which prevent or reduce prereaction between the ingredients by providing an inert coating on one or both of the flame retardants, which are in particulate form. Examples of suitable encapsulants include melamine resins such as melamine-formaldehyde resins, phenolic resins such as phenol-formaldehyde resins, epoxide resins, and the like.

U.S. Pat. No. 4,467,056 to Staendeke et al, assigned to Hoechst, is directed to encapsulation of ammonium polyphosphate with a melamine-formaldehyde resin in order to reduce water-solubility of ammonium polyphosphate. The melamine-formaldehyde resin can be partially etherified, as for example, a methyl-etherified or an ethyl-etherified resin. Ammonium polyphosphate is a well known flameproofing material, one specific type of which has the formula $(NH_4PO_3)_{700}$. Encapsulation can be accomplished by suspending ammonium polyphosphate in methanol, heating the suspension until methanol refluxes weakly, and then introducing an aqueous methanolic solution of the melamine-formaldehyde resin dropwise into the suspension. After a post-reaction period of ½ to 2 hours, the suspension is filtered and the filter residue is dried in a stream of nitrogen to dry and harden the coating on the ammonium polyphosphate. Encapsulated ammonium polyphosphate has a preferred mean particle size of about 0.01 to 0.05 mm. As noted in lines 36–41, column 2, of this patent, encapsulation of ammonium polyphosphate does not impair its flame-retarding property when used in plastics, especially polyurethanes.

U.S. Pat. No. 4,514,328 to Staendeke et al, also assigned to Hoechst, describes encapsulation of ammonium polyphosphate with an epoxide resin also for the purpose of making ammonium polyphosphate more water-resistant. In describing flameproofing property of ammonium polyphosphates, this patent discloses in lines 23–37 of column 1 that such ammonium polyphosphates are not fully satisfactory since they are not sufficiently water-resistant and therefore, can be washed out from the plastics with the passage of time under outdoor conditions. By encapsulating ammonium polyphosphate in a hardened epoxide resin, solubility of ammonium polyphosphate is substantially reduced and this has a beneficial effect on its use as a flame-proofing agent in polyurethane foam plastics. The epoxide resin is described as an alcohol-soluble hardenable resin which is prepared by reacting an dihydric or polyhydric alcohol with epichlorohydrin or glycerol dichlorohydrin under alkaline conditions, or in the presence of an acid catalyst and then treating it with an alkali. Ammonium polyphosphate particles can be coated with an alcoholic solution of the epoxide resin by hardening the resin with a hardener while stirring the solution or by evaporating the solvent from the suspension in a heated kneader while hardening the resin. Encapsulation of ammonium polyphosphate with an epoxide resin imparts same or similar benefits as encapsulation with melamine-formaldehyde resin, described above.

U.S. Pat. Nos. 4,467,056 and 4,514,328 are incorporated as if fully set forth herein.

Preparation of encapsulated materials can be accomplished by encapsulating each flame retardant individually and then combining the encapsulated flame retardants with other ingredients of the composition. Encapsulation can also be accomplished by mixing both of the flame retardants in a predetermined weight ratio in the presence of an encapsulant and encapsulating the flame retardants simultaneously. In this manner, a mixture of the flame retardants is obtained in an encapsulated foam and in a predetermined ratio. Such a mixture of flame retardants can then be admixed with a thermoplastic polyurethane resin and other conventional or desirable additives, in preparing the final composition.

The two U.S. patents discussed above disclose encapsulation of ammonium polyphosphate to render it more water-resistant. The discovery that the encapsulated flame retardants can be used to overcome the reduced effectiveness of unencapsulated materials due to processing, was totally unexpected since this aspect had nothing to do with water-solubility.

The intumescent and flame retarding compositions of this invention comprise a mixture of two principal flame retardants comprising a nitrogen-containing phosphate and a pentate salt present in the respective ratio of about 10–99% by weight of the phosphate to about 90–1% by weight of the pentate salt, based on 100% by weight of the two principal flame retardants. The preferred weight ratio is about 30–95% phosphate and about 70–5% pentate salt. These amounts include encapsulants. The flame retardant thermoplastic polyurethane compositions comprise a thermoplastic polyurethane resin together with a flame retarding combination of a nitrogen-containing phosphate and a pentate salt, noted above. In these compositions, amount of the flame retardants can vary within the range of about 10–60%, preferably 15–45% by weight, based on the total weight of the polyurethane resin and flame retardants.

The compositions disclosed herein can also contain a third flame retardant selected from aryl phosphates. Amount of the aryl phosphates can vary from about 0–15%, preferably about 1–10% by weight, based on the combined weight of the resin and the two principal flame retardants. In the case of the flame retarding compositions devoid of resin, amount of the aryl phosphates can vary from about 0–40% by weight, preferably from about 5–20%, based on the combined weight of the two principal flame retardants.

The polyurethanes are generally divided into thermoplastics and thermosets, and the thermoplastics are further divided into plastics and elastomers. This invention is directed to thermoplastic polyurethanes, including plastics and elastomers. The flame retardant thermoplastic polyurethane compositions suitable herein are also free of halogens.

The invention herein is directed to flame retardance of halogen-free polyurethanes, including plastics and elastomers. In a preferred embodiment, this invention is directed to thermoplastic polyurethane elastomers which are distinguished from the corresponding plastics on the basis of the glass transition temperature (Tg). The thermoplastic polyurethane elastomers have Tg of below 0° C., and preferably in the range of −10° C. to −55° C.

Thermoplastic polyurethanes are well known and are commercially available. They comprise a broad family of compositions having both urethane segments and non-urethane segments, with flammability characteristics varying widely, depending on the composition thereof. The polyurethanes are generally prepared from a diisocyanate, a polyester or polyether or other macroglycol, and a low molecular weight chain extender, such as a glycol or a diamine. If a cellular or a foamed polyurethane is desired, gas-generating additives, such as water or other blowing agents, are included in the reaction mixture.

Suitable thermoplastic polyurethanes, and their preparation, are disclosed in U.S. Pat. No. 4,542,170.

The first essential component of the flame retardant combination of this invention is a pentate salt selected from pentate salts of an amino-s-triazine. As is disclosed in U.S. Pat. No. 4,154,930, which is incorporated herein by reference for its description and preparation of the pentate salts, the amino-s-triazines of the formula

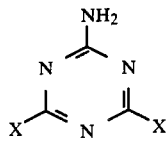

where X is —NH$_2$ or —OH, are known, as well as many derivatives thereof. The compound where X is NH$_2$ is melamine and the compound where X is OH is ammelide. The spiro compounds of the formula

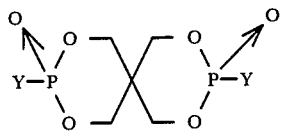

where Y is —OR or —Cl, are also well known and are referred to as derivatives of pentaerythrytol disphosphates or by their coined term of "pentates". Where Y is Cl, their compound is called dichloropentate.

The amino-s-triazines react with the hydrolysis product of dichloropentate to form water-insoluble on sparingly soluble salts of the structures:

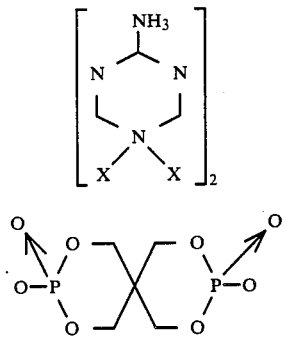

wherein X is selected from —NH$_2$ and —OH. Where X is NH$_2$, the compound is referred to herein as melammonium pentate, and where X is OH, the compound is referred to herein as pentate salts of ammelide. Both of these compounds are suitable herein. Such compounds are used in plastics as blowing agents, char-forming additives, and the like.

The pentate salts of amino-s-triazines are readily prepared by first hydrolyzing a pentate compound, such as dichloropentate, to provide a free acid, and then, reacting that product with the requisite amount of amino-s-triazine to form a sparingly soluble salt. More specifically, the dichloropentate can be first hydrolyzed by warming it with an aqueous alkali. The resulting product can then be added to a warm (70°–100° C.) aqueous solution of the amino-s-triazine containing sufficient mineral acid to dissolve the triazine. The sparingly soluble pentate salt precipitates from solution as a fine powder or as a crystalline material. Alternatively, an acid acceptor, such as a tertiary amine, can be used in place of the alkali to promote the hydrolysis reaction. As another alternative, the amino-s-triazine can be added to the aqueous mixture prior to hydrolysis, whereupon the pentate salt is formed and precipitates out as hydrolysis proceeds.

The pentate salts described herein are sufficiently stable to permit compounding and thermal processing thereof in conventional equipment. When heated to temperatures substantially greater than about 250° C., compositions containing the pentate salts expand due to thermal decomposition of the pentate salt and produce foam structures.

The second essential component of the flame retardant combination is a nitrogen-containing phosphate selected from amine phosphates, ammonium phosphates, and ammonium polyphosphates. Suitable amine phosphates include dimethylammonium phosphate, diethylammonium phosphate, ethylenediamine phosphate, and melamine orthophosphate and pyrophosphate. The preferred ammonium polyphosphates have the general formula $(NH_4)_{n+2} P_nO_{3n+1}$ where n is greater than 2, preferably greater than 50. The molecular weight of these polyphosphates should be sufficiently high to ensure a low solubility in water, which is indicated by n being between 400 and 800. Metaphosphates, generally having the formula $(NH_4PO_3)_n$, are also suitable herein. One commercial polyphosphate that is well known is "Phos-Chek P/30", which has analogous structure to $(NH_4)_{n+2} P_nO_{3n+1}$ where n is greater than 50.

There are five known crystalline forms or polymorphs of the ammonium polyphosphates. These forms differ in density or crystalline structure, and possibly other respects. The forms are identified as Forms I, II, III, IV, and V. For purposes herein, Forms I and II are known to be suitable, although Form II is preferred because of its enhanced thermal stability. Form II can be easily prepared from Form I by tempering it at 200° to 375° C. in a well-covered container. Form I can be prepared by heating equimolar mixture of $NH_4H_2PO_4$ and urea under anyhdrous ammonia at 280° C. for 16 hours. Form I has a density of 1.79 g/cc whereas Form II has a density of 1.94 g/cc. The other three forms of ammonium polyphosphate are not available.

Amount of the two principal flame retardants should be sufficient to render a thermoplastic polyurethane intumescent, flame retardant, and drip retardant. Some or all of these criteria can be measured by standard methods for determining Oxygen Index and UL94 Rating. The flame retardants can be added to the resin individually or as a single admixture, together with other desired additives.

The third flame retardant is selected from aryl phosphates. These aryl phosphates are known flame retardant plasticizers in the plastics industry. Suitable aryl phosphates for purpose herein include triaryl phosphates and alkyl aryl phosphates wherein the aryl moiety is preferably selected from substituted and unsubstituted phenyl groups. Specific examples thereof include isodecyl diphenyl phosphate, tricresyl phosphate, isopropylphenyl diphenyl phosphate, diisopropyl phenyl phosphate, p-tert-butylphenyl diphenyl phosphate, di-p-tert-butylphenyl diphenyl phosphate, p-tert-butyl triphenyl phosphate, and mixed isopropyl-phenyl diphenyl phosphate and phenyl diisopropylphenyl phosphate.

The particle size of flame retardants, and the additives that are added to the resin, is very important since physical properties of the resulting products are significantly affected. Generally, the finer the particle size the better. Although any available particulate flame retardants can be used successfully in the invention disclosed herein, it is preferred to use flame retardants of fine particle size. This applies to the phosphate and the pentate salt. Therefore, it is preferred to use flame retardants having an average particle size of less than 30 microns, and especially about 10 microns or less. The particle distribution of these materials is such that about 50% of the particles are less than 30 microns, preferably less than 10 microns.

It should be understood that, in addition to the flame retardants described herein, other additives can be employed in preparing polyurethane compositions. Examples of such additives are antioxidants, UV-stabilizers, lubricants, fillers, pigments, plasticizers, and the like. The additives referred to herein are added to the polyurethane composition as distinguished from polyurethane resin.

Compounding of the fire-retarded thermoplastic polyurethanes can be carried out by mixing the additives with a thermoplastic resin and extruding the compounded composition. As already noted, one or both of the flame retardants are encapsulated and a portion of the polyurethane resin can be pre-mixed with one or both of the flame retardants. The extrudate is then chopped into pellets which are injection or compression molded to form test specimens to facilitate testing of the composition for various properties. The level of the self-extinguishing potential of the compositions was determined on test bars measuring 75 mm × 6.5 mm with the thickness indicated in Table III to determine Oxygen Index by the procedure of ASTM D-2863 test. This index expresses the minimum percentage of oxygen in a flowing mixture of oxygen and nitrogen required to support flaming combustion. Therefore, an oxygen index of 21 means that combustion can be supported in air whereas an index of 29, indicates that the relative amount of oxygen in the environment of the sample must be considerably greater than what is found in air. Air consists of about 21% oxygen by volume.

The compositions were also tested pursuant to UL-94 standard to determine the self-extinguishing property thereof. It should be pointed out that for each evaluation, 5 test samples were used. The test conditions require that there be a total of 2 ignitions per sample. This is accomplished by igniting each sample for 10 seconds, removing the flame, and noting the time it takes for the flame to extinguish itself. After the sample becomes extinguished, it is ignited a second time and the steps are repeated. The total flaming combustion time is, therefore, the sum of the 10 time periods in seconds that are noted, each indicating the time it takes a flame to extinguish itself after flame removal. Also given is the number of test samples that dripped and those that ignited the cotton directly underneath. For instance, test results given as Drippers/Igniters of 1/0 means that of the 5 samples tested, one sample dripped and none ignited the cotton.

An additional test was also used to indicate flammability or lack of it with respect to a test sample. In this test, the objective was to determine the time interval of flame application until dripping took place. To achieve this objective, a flame was applied and kept on the sample until the test sample dripped, at which time, the flame was removed and the elapsed time was recorded as "Time to Drip" in seconds. This should be as long as possible, preferably in excess of 20 seconds.

The thermoplastic polyurethane compositions of the invention herein contained the following components:
(a) thermoplastic polyurethane resin
(b) encapsulated ammonium polyphosphate
(c) melammonium pentate
(d) triaryl phosphate
(e) titanium dioxide pigment
(f) wax lubricant
(g) UV stabilizer The thermoplastic polyurethane resin can be prepared by reacting a macroglycol of 1000 molecular weight of polytetraethylene ether glycol with 4,4'-diphenylmethene diisocyanate and 1,4-butanediol, in the presence of the usual antioxidants and UV stabilizers, that amounted to a couple of percent. The polyurethane resin used herein was Estane 58311, a non-halogen resin available from The B. F. Goodrich Company. The resin was prepared by the one-step melt polymerization procedure and had the following characteristics:

| | |
|---|---|
| Melt index (@ 210° C. & 3800 g load) | 20 |
| Shore Hardness (ASTM D-2240) | 85 A |
| Tg | −49° C. |
| Specific Gr. | 1.13 |
| Ult. Tensile Strength (ASRM D-412) | 47 MPa |
| Ult. Elongation (ASTM D-412) | 530% |
| OI | 22 |
| UL-94 Rating at 2 mm thickness | V2 |

Melammonium pentate (MP) and encapsulated ammonium polyphosphate (APP) had average particle size of about 20 microns. The ammonium polyphosphate used was Exolit 462 from Hoechst that is believed to have the formula $(NH_4PO_3)_{700}$ which was encapsulated with about 10% by weight melamine-formaldehyde resin, based on the weight of encapsulated resin. This phosphate was of the Form II structure, and had an average particle size of about 25 microns. The melammonium pentate used was micronized Incindex 1699, previously available from Borg Warner, and currently available as CN-329 from Great Lakes Chemical. The melammonium pentate had an average particle size of about 15 microns. The triaryl phosphate was Kronitex 100, available from FMC Corp. The titanium dioxide pigment was Tioxide R-FC6, available from Tioxide America. The wax lubricant was a montan wax ester, specifically Wax E, available from Hoechst and, the UV stabilizer was a benzotriazole, Tinuvin 328, obtained from Ciba-Geigy.

Density of the encapsulated ammonium polyphosphate was 1.88 g/cc versus 1.94 g/cc for the unencapsulated form. Density of the polyurethane resin was 1.13 g/cc, density of the melammonium pentate was 1.67 g/cc, density of the triaryl phosphate was 1.16 g/cc, density of the pigment was 4.10 g/cc, density of the wax lubricant was 1.01 g/cc, and the density of the benzotriazole was 0.91 g/cc.

The thermoplastic polyurethane compositions were compounded by first preparing three polyurethane based masterbatches: one containing the ammonium polyphosphate, a second containing the melammonium pentate, and a third containing the triaryl phosphate.

Compositions of these three masterbatches, in weight percent, are as follows:

| APP Masterbatch | |
|---|---|
| Polyurethane Resin | 43.4 |
| Ammonium Polyphosphate | 49.9 |
| Pigment | 5.7 |
| Lubricant | 1.0 |
| MP Masterbatch | |
| Polyurethane Resin | 52.0 |
| Melammonium Pentate | 45.4 |
| UV Stabilizer | 1.4 |
| Lubricant | 1.2 |
| Lubricant | |
| TAP Masterbatch | |
| Polyurethane Resin | 72.6 |
| Triaryl Phosphate | 27.4 |

Thermoplastic polyurethane compositions A, B, and C were then prepared by mixing the ammonium polyphosphate (APP) masterbatch, the melammonium pentrate (MP) masterbatch, the triaryl phosphate (TAP) masterbatch, and polyurethane resin (TPU) on the following weight percent basis given in Table I:

TABLE I

| | Thermoplastic Polyurethane Compositions | | |
|---|---|---|---|
| | A | B | C |
| Polyurethane Resin | 19.8 | 11.1 | 2.7 |
| APP Masterbatch | 47.5 | 51.5 | 55.4 |
| MP Masterbatch | 19.8 | 21.5 | 23.1 |
| TAP Masterbatch | 12.9 | 15.9 | 18.8 |
| | 100.0 | 100.0 | 100.0 |

For the purpose of facilitating understanding the content of the flame retardants in compositions A, B and C, the following Table II gives content, in weight percent, of each ingredient in the respective compositions:

TABLE II

| | Thermoplastic Polyurethane Compositions | | |
|---|---|---|---|
| | A | B | C |
| Polyurethane Resin | 60.1 | 56.2 | 52.4 |
| Ammonium Polyphosphate | 23.7 | 25.7 | 27.7 |
| Melammonium Pentate | 9.0 | 9.8 | 10.5 |
| Triaryl Phosphate | 3.5 | 4.3 | 5.1 |
| Titanium Dioxide | 2.7 | 3.0 | 3.2 |
| Wax | 0.7 | 0.7 | 0.8 |
| UV Stabilizer | 0.3 | 0.3 | 0.3 |
| | 100.0 | 100.0 | 100.0 |

The samples of compositions A, B and C were prepared, as described above, and then were subjected to the oxygen index (OI) test, the UL-94 test, and the total flame time. Samples A1, B1 and C1 were similarly prepared and tested. Samples A, B and C were identical to samples A1, B1 and C1 with one exception: whereas ammonium polyphosphate in samples A, B and C was not encapsulated with melamine-formaldehyde resin, samples A1, B1 and C1 contained ammonium polyphosphate which was encapsulated with about 10% by weight of melamine-formaldehyde resin. Therefore, compositions A1, B1 and C1 reflect the invention disclosed herein. Results are set forth in Table III, below where "t" represents sample thickness in millimeters:

TABLE III

| Sample | Comp'd Passes | "t" in mm | Gardner Reflect | OI | Flame Time | DI | Time to Drip | UL 94 Rating |
|---|---|---|---|---|---|---|---|---|
| A | 1 | 3 | 73.0 | 27.7 | 33 | 0/0 | 30 | V0 |
|   | 2 | 3 | 70.0 | 27.8 | 34 | 0/0 | 35 | V0 |
|   | 3 | 3 | 68.5 | 26.5 | 218* | 0/0 | 37 | None |
|   | 4 | 3 | 66.2 | 26.8 | 94* | 0/0 | 38 | None |
|   | 5 | 3 | 65.3 | 26.5 | 152* | 0/0 | 36 | None |
| B | 1 | 2.5 | 71.3 | 29.4 | 19 | 0/0 | 27 | V0 |
|   | 2 | 2.5 | 69.7 | 27.1 | 64* | 1/0 | 29 | None |
|   | 3 | 2.5 | 66.1 | 28.0 | 166* | 1/0 | 28 | None |
|   | 4 | 2.5 | 65.4 | 27.7 | 72* | 3/1 | 32 | None |
|   | 5 | 2.5 | 65.2 | 27.7 | 74* | 3/2 | 30 | None |
| C | 1 | 2 | 74.9 | 27.4 | 16 | 5/1 | 22 | V2 |
|   | 2 | 2 | 68.9 | 28.0 | 57* | 4/2 | 25 | None |
|   | 3 | 2 | 68.5 | 28.3 | 15 | 5/3 | 22 | V2 |
|   | 4 | 2 | 67.9 | 27.6 | 11 | 5/1 | 22 | V2 |
|   | 5 | 2 | 66.8 | 28.2 | 46* | 4/3 | 21 | None |
| A1 | 1 | 3 | 77.1 | 31.2 | 11 | 0/0 | 30 | V0 |
|   | 2 | 3 | 76.5 | 30.7 | 18 | 0/0 | 30 | V0 |
|   | 3 | 3 | 76.2 | 30.1 | 23 | 0/0 | 32 | V0 |
|   | 4 | 3 | 74.8 | 32.1 | 17 | 0/0 | 27 | V0 |
|   | 5 | 3 | 75.0 | 33.6 | 17 | 0/0 | 23 | V0 |
| B1 | 1 | 2.5 | 77.3 | 32.1 | 15 | 0/0 | 28 | V0 |
|   | 2 | 2.5 | 76.2 | 33.6 | 12 | 0/0 | 27 | V0 |
|   | 3 | 2.5 | 75.1 | 32.9 | 16 | 0/0 | 26 | V0 |
|   | 4 | 2.5 | 74.5 | 33.6 | 10 | 0/0 | 30 | V0 |
|   | 5 | 2.5 | 74.1 | 31.5 | 10 | 0/0 | 25 | V0 |
| C1 | 1 | 2 | 77.1 | 33.9 | 11 | 0/0 | 24 | V0 |
|   | 2 | 2 | 76.0 | 34.9 | 14 | 3/0 | 22 | V0 |
|   | 3 | 2 | 75.2 | 35.4 | 10 | 3/0 | 23 | V0 |
|   | 4 | 2 | 74.8 | 35.6 | 12 | 3/0 | 22 | V0 |
|   | 5 | 2 | 74.5 | 35.9 | 11 | 3/0 | 21 | V0 |

*burned to clamp

In Table III, above, the only difference between compositions A, B and C and compositions A1, B1 and C1 was that in compositions A1, B1, and C1, ammonium polyphosphate was encapsulated with about 10% by weight of a melamine-formaldehyde resin. This, of course, means that although compositions A, B, and C contained unencapsulated ammonium polyphosphate, they contained 11% more of the flame retardant than compositions A1, B1, C1, since the encapsulant was replaced with an equal weight amount of the flame retardant. Also, as should be apparent from Table II, above, amount of each flame retardant increased in each series of the compositions from A to C and from A1 to C1. Therefore, compositions A and A1 had the least amount of the flame retardants whereas compositions C and C1 had the most.

The term "Compound Passes" in Table III indicates number of times a composition was passed through a twin screw extruder before evaluation. As is noted in the table, five samples of composition were prepared. One sample of composition A was passed through extruder once and then tested, the second sample was passed through the extruder twice and then tested, and so on. After each pass through the extruder, the sample, which extruded in the form of a strand, was chopped to pellet size before being extruded again.

The results in Table III show that Gardner Reflectometer readings decreased with each pass through the extruder, indicating color degradation. The general degradation in properties with each succeeding pass through the extruder appears also to be true with respect to oxygen index and UL 94 tests, which was expected.

As between the encapsulated and unencapsulated ammonium polyphosphate, the color, oxygen index and UL 94 evaluations all appear to benefit from encapsulation of the flame retardant. The color, as measured by the Gardner Reflectometer, is much more constant and improved for the encapsulated as compared to the unencapsulated flame retardant. Oxygen Index is generally at least 3 units higher and the UL 94 test results are improved and also are more reproducible, for the encapsulated over the unencapsulated flame retardant.

We claim:

1. A composition of matter adapted to render thermoplastic polyurethane compositions flame retardant comprising a pentate salt of an amino-s-triazine selected from melammonium pentate, pentate salts of ammelide, and mixtures thereof, and a nitrogen-containing phosphate selected from amine phosphates, ammonium phosphates, ammonium polyphosphates, and mixtures thereof, wherein said pentate salt and/or said nitrogen-containing phosphate is encapsulated to reduce contacts between the ingredients during processing in an encapsulant selected from melamine resins, phenolic resins, epoxy resins, and mixtures thereof.

2. Composition of claim 1 containing about 10–99% by weight of said nitrogen-containing phosphate to about 90–1% by weight of said pentate salt, based on the weight of said phosphate and said salt.

3. Composition of claim 2 containing about 30–95% of said phosphate and about 70–5% by weight of said salt, and 0.5 to 25% by weight of said encapsulant, amount of said encapsulant being based on the weight of said phosphate and said salt; said pentate salt is selected from melammonium pentate, the pentate salt of ammelide, and mixtures thereof; and said nitrogen-containing phosphate is selected from ammonium polyphosphate of the formula $(NH_4)_{n+2}P_nO_{3n+1}$ where n is greater than 50.

4. Composition of claim 3 including up to about 50% by weight of an aryl phosphate, based on the weight of said nitrogen-containing phosphate and said salt; wherein n in said ammonium polyphosphate is in the range of about 400 to 800, and said nitrogen-containing phosphate and said salt have an average particle size of less than about 30 microns.

5. Composition of claim 4 wherein said pentate salt is unencapsulated melammonium pentate, said phosphate is encapsulated ammonium polyphosphate, said encapsulant is selected from melamine-formaldehyde resins encapsulating said polyphosphate, and amount of said encapsulant is 5 to 15%.

6. Flame retardant polyurethane composition comprising a thermoplastic polyurethane resin; a pentate salt of an amine-s-triazine selected from melammonium pentate, pentate salts of ammelide, and mixtures thereof; a nitrogen-containing phosphate selected from amine phosphates, ammonium phosphates, ammonium polyphosphates, and mixtures thereof; and an encapsulant encapsulating one or both of said pentate salt and said phosphate to reduce contacts between the ingredients during processing selected from melamine resins, phenolic resins, epoxy resins, and mixtures thereof.

7. Composition of claim 6 wherein said phosphate is present in an amount of about 10–99% and said salt is present in an amount of about 90–1%, based on the combined weight of said phosphate and said salt; combined weight of said phosphate and said salt in said composition being about 10–60%, based on the combined weight of said resin, said phosphate and said salt; and amount of said encapsulant is 0.5 to 25%, based on the combined weight of said phosphate and said salt.

8. Composition of claim 7 wherein amount of said phosphate is about 30–95% and amount of said salt is about 70–5%, based on the weight of said phosphate and said salt; wherein said phosphate is selected from ammonium polyphosphates of the formula $(NH_4)_{n+2}P_nO_{3n+1}$ where n is greater than 50; wherein average particle size of said phosphate and said salt is less than about 30 microns; and amount of said encapsulant is 5 to 15%. salt is less than about 30 microns; and amount of said encapsulant is 5 to 15%.

9. Composition of claim 8 including up to about 40% of an aryl phosphate, based on the weight of said nitrogen-containing phosphate and said salt.

10. Composition of claim 9 wherein said pentate salt is melammonium pentate, said ammonium polyphosphate has n in the range of 400 to 800; and said polyurethane is an elastomer having Tg of less than 0° C.

11. Composition of claim 10 wherein said polyurethane is a halogen-free linear polymer with a Tg of −10° C. to −55° C., and said composition has oxygen index of 29 or greater, is drip retardant, and meets UL94-VO rating.

12. Composition of claim 11 wherein said encapsulant is selected from melamine-formaldehyde resins.

* * * * *